United States Patent
Hirashima (10) Patent No.: US 6,608,943 B1
(45) Date of Patent: Aug. 19, 2003

(54) IMAGE PROCESSING METHOD AND APPARATUS

(75) Inventor: Takuya Hirashima, Kanagawa (JP)

(73) Assignee: Fuji Photo Film, Co., Ltd., Kanagawa (JP)

(*) Notice: Subject to any disclaimer, the term of this patent is extended or adjusted under 35 U.S.C. 154(b) by 0 days.

(21) Appl. No.: 09/498,360

(22) Filed: Feb. 4, 2000

(30) Foreign Application Priority Data

Feb. 5, 1999 (JP) ............................................. 11-028405

(51) Int. Cl.⁷ ............................. G06K 9/32; G06F 15/00
(52) U.S. Cl. ..................... 382/298; 382/300; 358/1.2; 358/525
(58) Field of Search ................................ 382/151, 173, 382/224, 252, 275, 293, 298, 299, 300, 254; 358/1.2, 3.01, 505, 528, 533, 451, 463, 525, 3.26, 296; 345/660, 670, 671

(56) References Cited

U.S. PATENT DOCUMENTS

| | | | | |
|---|---|---|---|---|
| 4,682,243 A | * | 7/1987 | Hatayama ................... | 358/451 |
| 4,750,048 A | * | 6/1988 | Satoh et al. ................ | 358/528 |
| 4,812,915 A | * | 3/1989 | Tada ........................... | 358/451 |
| 4,893,195 A | * | 1/1990 | Tada et al. ................. | 358/3.26 |
| 5,418,899 A | * | 5/1995 | Aoki et al. ................. | 345/668 |
| 5,535,007 A | * | 7/1996 | Kim ............................ | 358/296 |
| 6,091,513 A | * | 7/2000 | Ishihara et al. ............. | 358/1.9 |
| 6,181,834 B1 | * | 1/2001 | Li et al. ..................... | 382/298 |

FOREIGN PATENT DOCUMENTS

JP    1098612    4/1998

* cited by examiner

Primary Examiner—Bhavesh M. Mehta
Assistant Examiner—Kanji Patel
(74) Attorney, Agent, or Firm—Birch, Stewart, Kolasch & Birch, LLP (57) ABSTRACT

There is provided an image processing method for performing magnification processing at a specified magnifying power. The method divides the magnification processing at the specified magnifying power into a first magnification processing step and a second magnification processing step and performs the first and second magnification processing steps. A start position of the first magnification processing step and a start position of the second magnification processing step are dislocated relatively to each other so that phases of pixel positions in the first and second magnification processing steps are reversed to each other. There is also provided an image processing apparatus for implementing the method. Artifacts that are generated in image magnification (enlargement and reduction) processing can be suppressed.

18 Claims, 5 Drawing Sheets

IMAGE PROCESSING METHOD AND APPARATUS

BACKGROUND OF THE INVENTION

The present invention relates to an image processing method and an image processing apparatus, and more specifically, to an image processing technology for suppressing artifacts generated in the magnification processing or the scaling of an image.

Images recorded on photographic film originals such as negative films, reversal films and the like are conventionally printed onto light-sensitive materials such as photographic papers and the like by so-called direct exposure, that is, a method in which an image on a film original is projected onto a light-sensitive material for areal exposure.

In contrast, there has been recently proposed a digital photoprint system which makes use of digital exposure. Briefly, the system photoelectrically reads image information recorded on a film, converts the thus read image into digital signals and thereafter subjects the digital signals to various steps of image processing to thereby provide image information for recording purposes; a latent image is recorded on a light-sensitive material by scan exposing it with recording light which has been modulated in accordance with the image information, and is then developed to produce a finished print. Digital photoprinters for embodying the above digital photoprint system are under development.

The digital photoprint system can freely perform editing and layouts jobs for print images such as composition of a plurality of images to a composite image, division of a single image into segments, editing of characters and images and the like and various types of image processing such as color/density adjustment, electronic magnification (scaling), edge sharpening (sharpness enhancement) and the like, and output finished prints which are freely subjected to editing and image processing in accordance with a specific use.

At the time, an image must be magnified (enlarged or reduced) in accordance with the size of an image to be output. Otherwise, the image is often reproduced with particularly a portion thereof being enlarged. In this case, electronic magnification processing is performed.

Further, image forming apparatuses such as digital copiers, facsimiles and the like also subject as required an image input with a scanner to magnification processing.

However, when the input image is enlarged or reduced, there has been conventionally arisen the following problem. That is, a sampling pitch in image inputting interferes with a re-sampling pitch in enlargement or reduction processing, which generates artifacts such as moiré and beats that are streaky irregularities.

To cope with this problem, for example, Japanese Unexamined Patent Publication No. 10-98612 discloses an image processing apparatus wherein a random coefficient, which is used for the enlargement and reduction of an image, is generated and the generated random coefficient is multiplied by a pixel value within a predetermined range including a pixel of interest in image data to be processed so as to form image data used for image enlargement or reduction, whereby the artifacts which are generated by the interference of the sampling pitch of a scanner with the re-sampling pitch in enlargement or reduction are suppressed.

However, the apparatus disclosed uses the random coefficient to diffuse the possibility of the artifacts and cannot perform processing in accordance with the frequency that the image has, which presents a problem that frequency characteristics cannot be realized. Then, when obtaining further reducing effects, it is difficult to obtain appropriate reducing effects of the artifacts in accordance with the image, no matter how the image is.

SUMMARY OF THE INVENTION

An object of the present invention, which was made in view of the above conventional problems, is to provide an image processing method capable of suppressing the artifacts that are generated in the magnification (enlargement and reduction) of an image. Another object of the invention is to provide an image processing apparatus for implementing the above method.

In order to attain the first object, the present invention provides an image processing method for performing magnification processing at a specified magnifying power, comprising the steps of:

dividing the magnification processing at the specified magnifying power into a first magnification processing step and a second magnification processing step; and performing the first magnification processing step and the second magnification processing step, wherein a start position of the first magnification processing step and a start position of the second magnification processing step are dislocated relatively to each other so that phases of pixel positions in the first and second magnification processing steps are reversed to each other.

Preferably, when the specified magnifying power is represented by s, the first and second magnification processing steps have magnifying powers represented by $(s+1)/2$ and $2s/(s+1)$, respectively.

Preferably, the magnifying power of the first magnification processing step is represented by $(s+1)/2$ and the magnifying power of the second magnification processing step is represented by $2s/(s+1)$.

Preferably, when the specified magnifying power is represented by $s_1$ in a first direction and by $s_2$ in a second direction perpendicular to the first direction, respectively, the first magnification processing step has a magnifying power in the first direction represented by $(s_1+1)/2$ and a magnifying power in the second direction represented by $(s_2+1)/2$, respectively, and the second magnification processing step has a magnifying power in the first direction represented by $2s_1/(s_1+1)$ and a magnifying power in the second direction represented by $2s_2/(s_2+1)$, respectively.

Preferably, the magnifying power $s_1$ in the first direction is equal to the magnifying power $s_2$ in the second direction.

Preferably, in the first and second magnification processing steps, the start position of the first magnification processing step and the start position of the second magnification processing step are dislocated relatively to each other in the first direction and the second direction perpendicular to the first direction.

Preferably, in the first and second magnification processing steps, the start position of the first magnification processing step and the start position of the second magnification processing step are dislocated relatively to each other by ½ of a pixel cycle in the first direction and the second direction perpendicular to the first direction.

Preferably, the start position of the second magnification processing step is dislocated by ½ of the pixel cycle with respect to the start position of the first magnification processing step in the first direction and the second direction perpendicular to the first direction.

Preferably, the magnification processing at the specified magnifying power is performed on a multi-level image.

In order to attain the second object, the present invention also provides an image processing apparatus for performing magnification processing at a specified magnifying power, comprising:

a device for performing a first magnification processing step;

a device for performing a second magnification processing step; and a device for dislocating a start position of the first magnification processing step and a start position of the second magnification processing step relatively to each other so that phases of pixel positions in the first and second magnification processing steps are reversed to each other.

Preferably, when the specified magnifying power is represented by s, the first and second magnification processing steps have magnifying powers represented by $(s+1)/2$ and $2s/(s+1)$, respectively.

Preferably, the magnifying power of the first magnification processing step is represented by $(s+1)/2$ and the magnifying power of the second magnification processing step is represented by $2s/(s+1)$.

Preferably, when the specified magnifying power is represented by $s_1$ in a first direction and by $s_2$ in a second direction perpendicular to the first direction, respectively, the device for performing the first magnification processing step performs the magnification processing in which magnifying powers in the first and second directions are represented by $(s_1+1)/2$ and $(s_2+1)/2$, respectively, and the device for performing the second magnification processing step performs the magnification processing in which magnifying powers in the first and second directions are represented by $2s_1/(s_1+1)$ and $2s_2/(s_2+1)$, respectively.

Preferably, the magnifying power $s_1$ in the first direction is equal to the magnifying power $s_2$ in the second direction.

Preferably, the device for dislocating the start position of the first magnification processing step and the start position of the second magnification processing step is a device by which the start position of the first magnification processing step and the start position of the second magnification processing step are dislocated relatively to each other in the first direction and the second direction perpendicular to the first direction in the first and second magnification processing steps.

Preferably, the device for dislocating the start position of the first magnification processing step and the start position of the second magnification processing step is a device by which the start position of the first magnification processing step and the start position of the second magnification processing step are dislocated relatively to each other by ½ of a pixel cycle in the first direction and the second direction perpendicular to the first direction.

Preferably, the device for dislocating the start position of the first magnification processing step and the start position of the second magnification processing step dislocates the start position of the second magnification processing step by ½ of the pixel cycle with respect to the start position of the first magnification processing step in the first direction and the second direction.

Preferably, the magnification processing at the specified magnifying power is performed on a multi-level image.

DETAILED DESCRIPTION OF THE INVENTION

An image processing method and an image processing apparatus of the present invention will be described below in detail based on preferable embodiments shown in the accompanying drawings.

Figure 1:
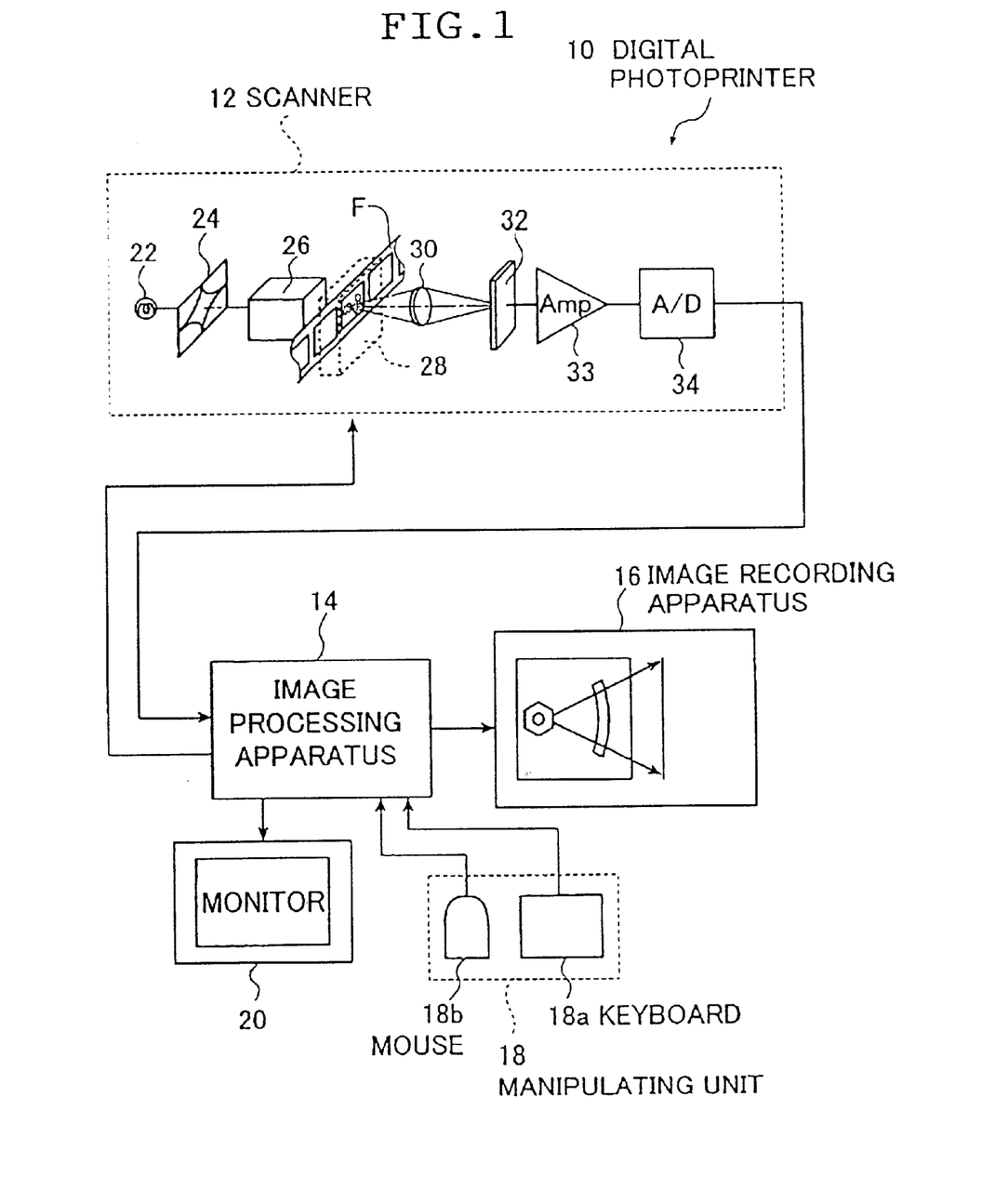
FIG. 1 is a block diagram schematically showing an exemplary digital photoprinter to which an image processing apparatus for embodying an image processing method according to an embodiment of the present invention is applied.

FIG. 1 is a block diagram schematically showing an exemplary digital photoprinter to which the image processing apparatus for embodying the image processing method according to an embodiment of the present invention is applied.

The digital photoprinter shown in FIG. 1 (which is hereunder simply referred to as "photoprinter") 10 includes a scanner (image reading apparatus) 12 for photoelectrically reading an image recorded on a film F and an image processing apparatus 14 which performs image processing such as magnification (enlargement and reduction) processing which is a feature of the present invention, edge detection, sharpness enhancement, smoothing processing (graininess suppression) and the like on image data read by the scanner 12 and with which the photoprinter 10 as a whole is manipulated and controlled. Further, the photoprinter 10 includes an image recording apparatus 16 which performs imagewise exposure of a light-sensitive material (photographic paper) with light beams modulated in accordance with the image data delivered from the image processing apparatus 14 and which performs development and other necessary processing to output a (finished) image as a printer.

Connected to the image processing apparatus 14 are a manipulating unit 16 having a keyboard 18a and a mouse 18b to enter and set various conditions, to select and issue a command for a specific processing step and to enter commands for color/density correction, as well as a monitor 20 that displays the image read with the scanner 12, various kinds of manipulative instructions, and screens on which various conditions are set and/or registered.

The scanner 12 is an apparatus for reading the image on the film F photoelectrically frame by frame. It includes an illuminant 22, a variable diaphragm 24, a diffuser box 26 with which reading light incident on the film F is made uniform on the plane of the film F, a carrier 28 of the film F, an imaging lens unit 30, an image sensor 32 having line CCD sensors corresponding to the reading of the densities of the respective R (red), G (green) and B (blue) color images, an amplifier 33 and an A/D (analog/digital) converter 34.

In the photoprinter 1C, dedicated carriers 28, which can be selectively mounted on the housing of the scanner 12 are prepared depending upon such factors as the type and size of the film F (e.g. whether it is a film for an Advanced Photo System or a negative (or reversal) film of 135 size) and the physical form of the film F (e.g. whether it is a strip or a slide). By replacing one carrier with another, the photoprinter 10 is capable of processing various kinds of films. An image recorded on a frame of the film F and used to create a print is transported to a preset reading position by the carrier 28.

When the image recorded on the film F is read in the scanner 12, the reading light emitted from the illuminant 22 is adjusted in quantity through the variable diaphragm 24 and the diffuser box 26 to be made uniform, and then is incident on the film F which is held at the preset reading position by the carrier 28, through which it is transmitted to produce projected light carrying the image recorded on the film F.

Note that a color image signal to be input for image processing is not limited to the one obtained by reading light which passed through the films as described above, and it may be obtained from a reflection original. Alternatively, an image taken with a digital camera may be used.

The illustrated carrier 28 transports elongated films F (strips) such as a 24-exposure film of 135 size, a cartridge for the Advance photo System, and the like.

Being held in registry with the reading position by the carrier 28, the film F is illuminated with the reading light while it is transported in an auxiliary scanning direction, which is perpendicular to a main scanning direction in which the R, G and B line CCD sensors extend. Consequently, the film F is subjected to two-dimensional slit scan, whereupon the image of each frame recorded on the film F is captured.

The light projected from the film F is focused by the imaging lens unit 30 to form an image on the light-receiving plane of the image sensor 32.

The respective output signals of R, G and B from the image sensor 32 are amplified with the amplifier 33 and supplied to the A/D converter 34. In the A/D converter 34, the output signals are converted into R, G and B digital image data of, for example, 12 bits and then supplied to the image processing apparatus 14.

In the scanner 12, the images recorded on the film F are captured by two scans, the first being prescan at a low resolution (the first image reading) and the second being fine scan for obtaining image data for images to be output (the second image reading).

Prescan is carried out under preset reading conditions for prescan such that all the images of the film F to be processed by the scanner 12 can be read without saturating the image sensor 32.

In contrast, fine scan is performed under reading conditions for fine scan that are set for each frame from the prescanned data such that the image sensor 32 is saturated at a slightly lower density than the minimum density of the image (frame) of interest.

Note that the output image signals for prescan and fine scan are essentially the same data except for resolution and output image signal level.

It should be noted that the scanner 12 to be used in the photoprinter 10 is by no means limited to the type that relies upon the slit scan reading described above but that it may be of a type that relies upon areal reading, or a technique by which the entire surface of the film image in one frame is captured at a time.

As described above, the digital image data signals output from the scanner 12 are supplied to the image processing apparatus 14 which embodies the image processing method of the present invention.

Figure 2:
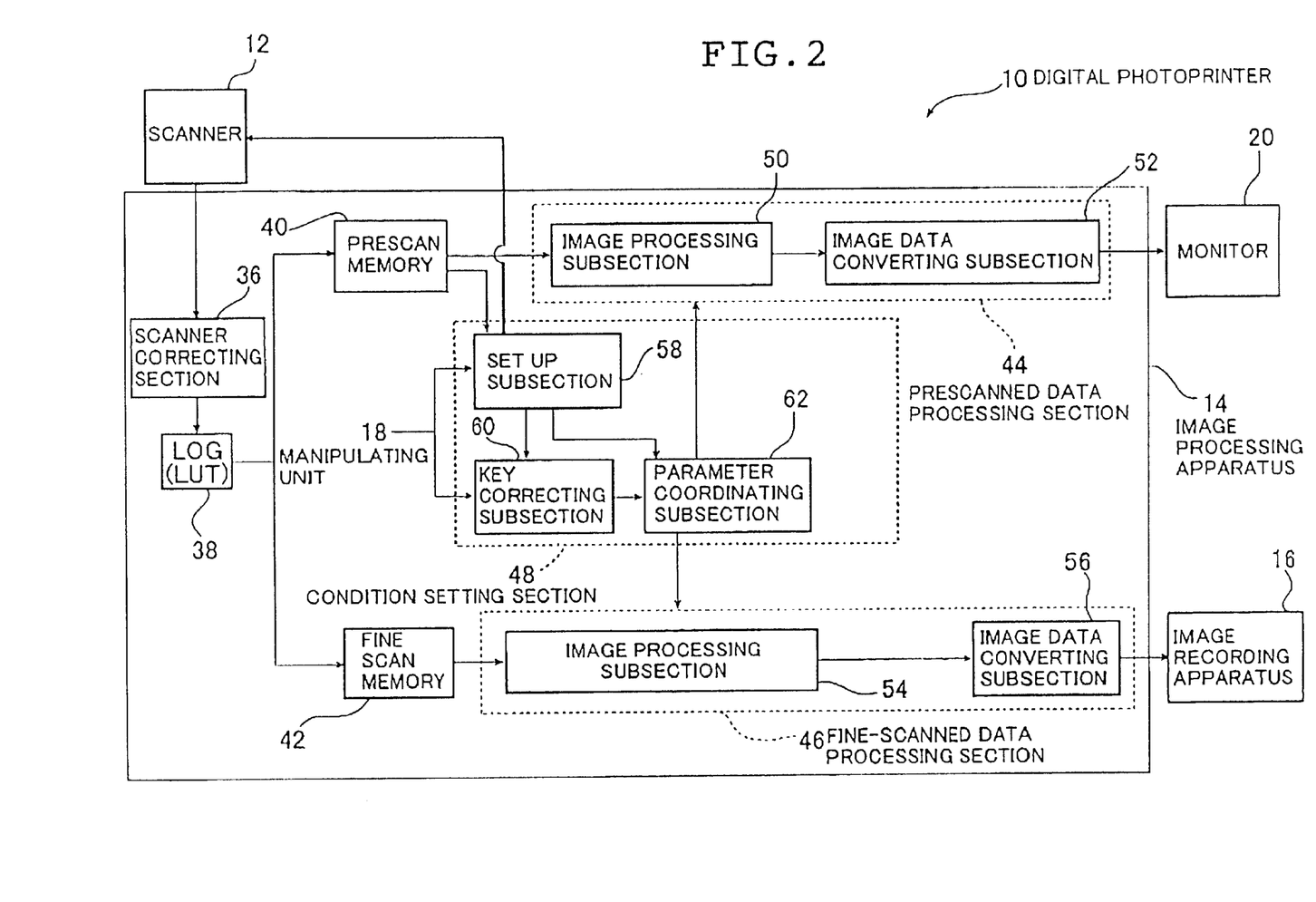
FIG. 2 is a block diagram schematically showing an exemplary image processing apparatus according to the embodiment under consideration.

FIG. 2 shows a block diagram of the image processing apparatus (which is hereunder simply referred to as "processing apparatus"). The processing apparatus 14 includes a scanner correcting section 36, a LOG converter 38, a prescan (frame) memory 40, a fine scan (frame) memory 42, a prescanned data processing section 44, a fine-scanned data processing section 46, and a condition setting section 48.

FIG. 2 shows only the sites related to image processing and besides these sites, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the monitor 20 are connected to related sites via the CPU and the like (CPU bus).

The R, G and B image signals, for example, the digital image data of 12 bits, which have been input from the scanner 12 to the processing apparatus 14, are supplied to the scanner correcting section 36.

The scanner correcting section 36 carries out the data correction of the captured image data such as DC offset correction, darkness correction, defective pixel correction, shading correction, and the like in order to correct the dispersion of the sensitivity of each of the pixels, the dark current and the like of the R, G and B digital image data, which are caused by the R, G and B line CCD sensors of the image sensor 32 in the scanner 12. The digital image signals, which have been subjected to the processing for correcting the dispersion of the sensitivity of each of the pixels and the dark current by the scanner correcting section 36, are supplied to the LOG converter 38.

The LOG converter 38 performs gradation conversion of the digital image data through logarithm conversion processing to produce digital image density data. Thus, digital image data of 12 bits, which has been corrected by the scanner correcting section 36, is converted into digital image density data of, for example, 10 bits (0–1023) by means of a look-up table (LUT).

The digital image density data, which has been converted by the LOG converter 38, is memorized (stored) in the prescan memory 40, if it is prescanned image data, whereas the data is memorized (stored) in the fine scan memory 42, if it is fine-scanned image data, respectively.

The prescan memory 40 is a frame memory for storing or memorizing the low resolution image density data of each of R, G and B colors in one entire frame of the film F. The low resolution image density data is obtained by prescanning the film F with the scanner 12 and subjecting the data obtained by the prescan to various kinds of processing for data correction and the logarithmic conversion processing. The prescan memory 40 must have a capacity capable of storing the image density data of R, G and B three colors of the image recorded on at least one frame of the film F. However, the prescan memory 40 may have a capacity capable of storing the image density data for a plurality of frames, or may be composed of a multiplicity of memories each having a capacity for one frame.

The prescanned image data stored in the prescan memory 40 is read into the prescanned data processing section 44.

In contrast, the fine scan memory 42 is a frame memory for storing or memorizing the high resolution image density data of each of R, G and B colors in one entire frame of the film F. The high resolution image density data is obtained by fine-scanning the film F with the scanner 12 and subjecting the data obtained by the fine-scan to various kinds of processing for data correction and the logarithmic conversion processing.

The fine-scanned image data stored in the fine scan memory 42 is read into the fine-scanned data processing section 46.

The prescanned data processing section 44 includes an image processing subsection 50 and an image data converting subsection 52. The prescanned data processing section 44 subjects the prescanned image data stored in the prescan memory 40 to various image processing steps which are necessary for the display on the monitor 20.

The image processing subsection 50 performs predetermined image processing such as gradation correction, color conversion, density conversion and the like on the image data which has been read with the scanner 12 and stored in the prescan memory 40. This image processing is performed according to the image processing conditions set by a condition setting section 48 to be described later using a look-up table (hereinafter, abbreviated as LUT) and matrix (hereinafter, abbreviated as MTX) operation so that a color image having a desired quality can be reproduced on the CRT display screen of the monitor 20 which will be described later.

The image data converting subsection 52 magnifies as required the image data processed in the image processing subsection 50 so that the image data is matched with the resolution of the monitor 20 and then converts it to the image data for the display on the monitor 20 used a 3-D (three-dimensional) LUT and the like in the same way, thereby outputting the image data for the display on the monitor 20.

Note that the image processing conditions in the image processing subsection 50 are set by the condition setting section 48 which will be described later.

The fine-scanned data processing section 46 includes an image processing subsection 54 and an image data converting subsection 56. The fine-scanned data processing section 46 subjects the fine scanned image data stored in the fine scan memory 42 to various image processing steps and the image processing method of the present invention that are necessary to permit the fine scanned image data to be output from the image recording apparatus 16 as a color print.

The image processing subsection 54 subjects the image data that has been read with the scanner 12 and stored in the fine scan memory 42 to predetermined image processing, according to the image processing conditions set by the condition setting section 48 to be described later, and ensures that an image of high quality with density, gradation and color tone desired as a color print can be reproduced on a color paper. For this purpose, the image processing subsection 54 subjects the image data to various image processing steps such as color balance adjustment, gradation adjustment, color adjustment, density adjustment, saturation adjustment, magnification (enlargement and reduction), sharpness enhancement (edge enhancement; sharpening), and the like by means of the LUT, a MTX operation unit, a low-pass filter, an adder/subtracter and the like.

The image data converting subsection 56 converts the image data which has been processed by the image processing subsection 54, into image data suitable for image recording by the image recording apparatus 16 using, for example, a standard gradation look-up table such as a 3-D LUT or the like and supplies the thus converted image data to the image recording apparatus 16.

The image recording apparatus 16 outputs the image data output from the fine-scanned data processing section 46 as a finished print on which a color image is reproduced.

The image processing conditions in the image processing subsection 54 are set by the condition setting section 48.

The condition setting section 48 sets various processing conditions including the reading conditions for fine scan and the image processing conditions in the prescanned data processing section 44 and the fine-scanned data processing section 46. The condition setting section 48 includes a setup subsection 58, a key correcting subsection 60 and a parameter coordinating subsection 62.

The setup subsection 58 sets the reading conditions for fine scan using the prescanned image data and the like and supplies them to the scanner 12. Further, the setup subsection 58 creates (calculates) the image processing conditions in the prescanned data processing section 44 and the fine-scanned data processing section 46 and supplies them to the parameter coordinating subsection 62.

The key correcting subsection 60 calculates the amounts of adjustment of the image processing conditions (for example, the amount of correction of the LUT and the like) in accordance with the amounts of adjustment of the density (brightness), color, contrast, sharpness, saturation and the like, which have been set with the keys (not shown) on the keyboard 18a in the manipulating unit 18, and various commands entered with the mouse 18b, thereby setting parameters. The thus set parameters are supplied to the parameter coordinating subsection 62.

The parameter coordinating subsection 62 receives the image processing conditions set by the setup subsection 58, sets the supplied image processing conditions to the image processing subsection 50 of the prescanned data processing section 44 and to the image processing subsection 54 of the fine-scanned data processing section 46. Further, the parameter coordinating subsection 62 corrects (adjusts) the image processing conditions set to the respective subsections in accordance with the amounts of adjustment calculated by the key correcting subsection 60 or makes another setting of the image processing conditions.

Subsequently, the image processing subsection 54 of the fine-scanned data processing section 46 that performs image processing such as magnification (enlargement and reduction) processing characterizing the present invention will be described in detail.

Figure 3:
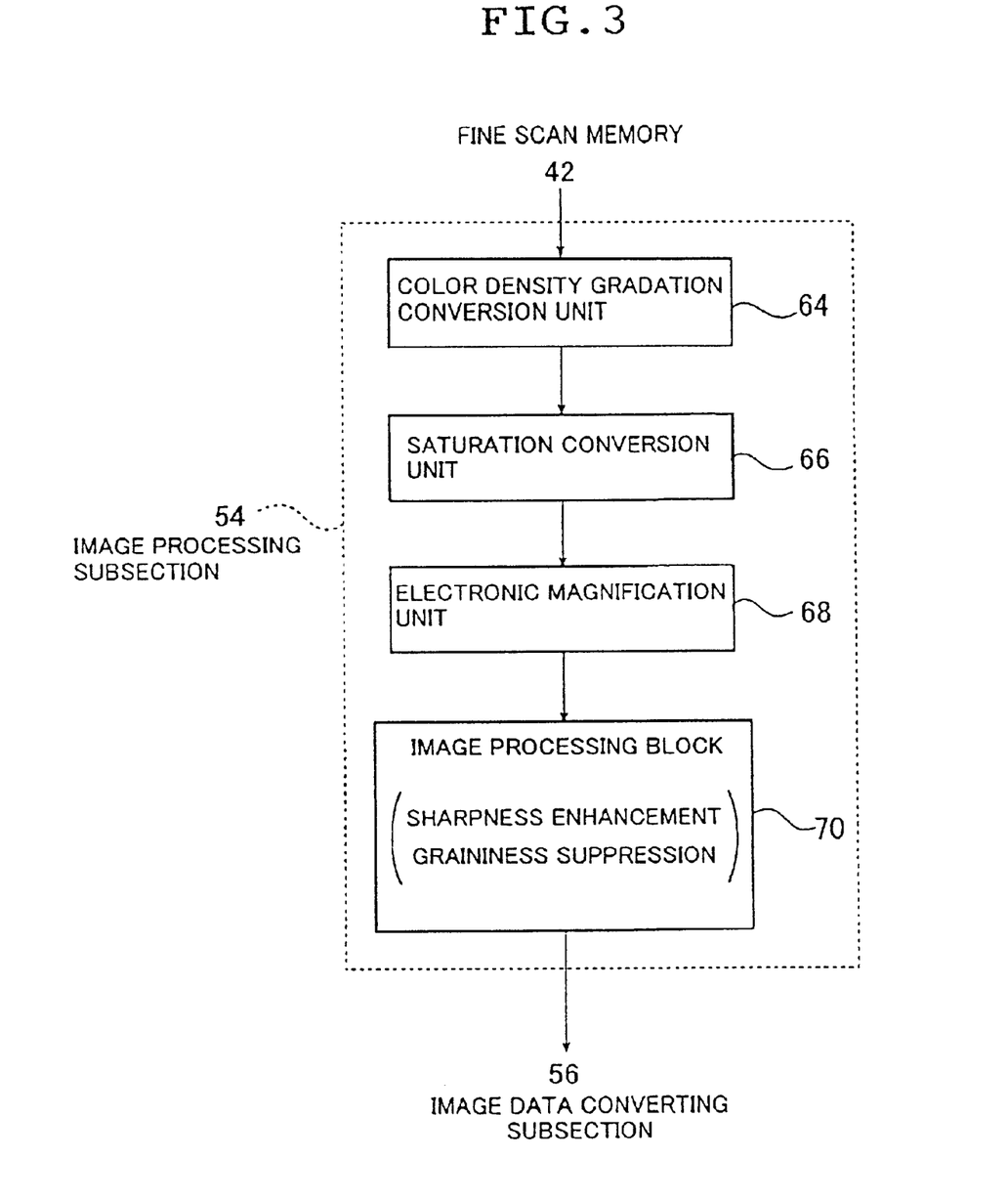
FIG. 3 is a block diagram schematically showing an exemplary image processing subsection in a fine-scanned data processing section of the image processing apparatus shown in FIG. 2.

FIG. 3 is a block diagram schematically showing an example of the image processing subsection 54. As shown in FIG. 3, the image processing subsection 54 includes a color/density/gradation conversion unit 64 for converting the density, color and gradation of image data, and saturation conversion unit 66 for converting the saturation of the image data, a digital magnification conversion (electronic magnification) unit 68 for performing magnification by converting the number of pixels of the image data, and an image processing block 70 for performing various image processing steps such as sharpness enhancement, graininess suppression and the like.

In the image processing subsection 54, the color/density/gradation conversion unit 64 converts the image data into density data, color data and gradation data according to a LUT and the like. Further, the saturation conversion unit 66 converts the image data obtained in the color/density/gradation conversion unit 64 into saturation data by MTX operation and the like. The electronic magnification unit 68 interpolates or thins out the image data which has been subjected to the saturation conversion by the saturation conversion unit 66, in accordance with the size of a color image to be output on a color paper by the image recording apparatus 16 and in agreement with the densities of the output pixels, thereby increasing or decreasing the number of pixel data of the image data. Further, the image processing block 70 performs image processing such as the sharpness enhancement, graininess suppression and the like.

Figure 4:
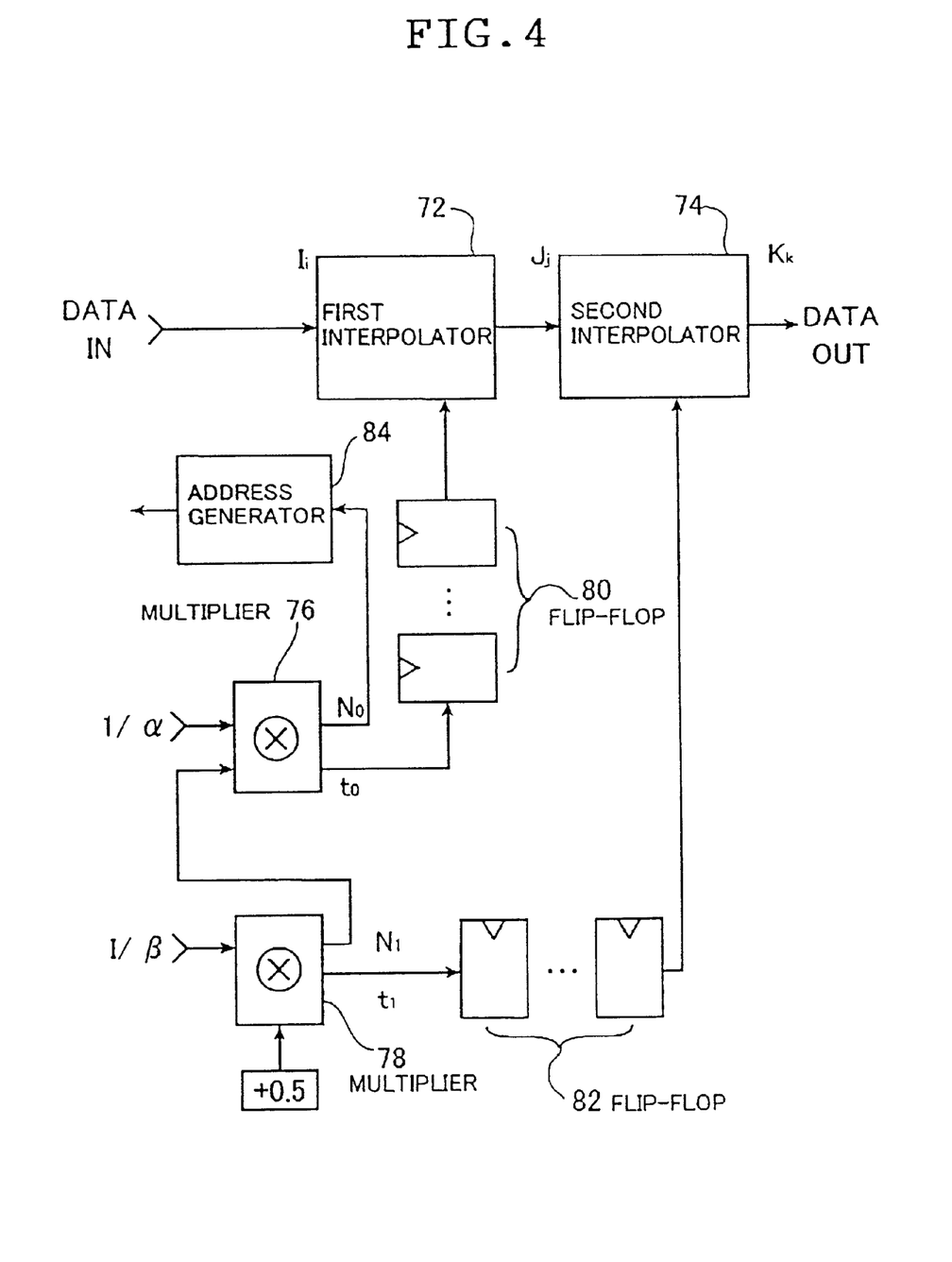
FIG. 4 is a block diagram schematically showing an exemplary electronic magnification unit in the image processing subsection shown in FIG. 3.

FIG. 4 is a block diagram showing the schematic arrangement of the electronic magnification unit 68 according to the embodiment under consideration. The image magnification (enlargement and reduction) processing according to the present invention suppresses artifacts by the following procedure. That is, the magnification processing is divisionally performed twice by interpolating image data, wherein the cycles of the artifacts which are generated in a first magnification processing step and a second magnification processing step, respectively, are made equal to each other and the phases of the cycles are reversed.

Note that the present invention can be also applied to an image processing method in which an interpolation kernel is decomposed in a first direction, for example, a horizontal direction and a second direction perpendicular to the first direction, for example, a vertical direction for the magnification processing of an image, in particular a multi-level image. It should be noted here that, in the following description, the first direction and the second direction perpendicular to the first direction are taken as the horizontal direction and the vertical direction, respectively, and that the matrix of a coefficient representing the interpolation kernel is decomposed to a row vector coefficient and a column vector coefficient and the interpolation in the vertical direction follows the interpolation in the horizontal direction. Further, the following description is only directed to a linear (one-dimensional) case in the horizontal direction.

Since the electronic magnification unit 68 divisionally performs the magnification by means of interpolation twice, it includes a first interpolator 72 for performing a first magnification and a second interpolator 74 for performing a second magnification. Multipliers 76 and 78 and flip-flops 80 and 82 are connected to the first and second interpolators 72 and 74, respectively. The multiplier 76 connected to the first interpolator 72 is connected to an address generator 84. Further, the multiplier 78 connected to the second interpolator 74 is connected to the address generator 84 through the multiplier 76.

The reciprocal number $1/\alpha$ of a magnifying power $\alpha$ in the first magnification processing is input to the multiplier 76. The reciprocal number $1/\alpha$ represents a sampling interval in the first magnification processing. The multiplier 76 integrates $1/\alpha$ in the first magnification processing and the obtained value is divided into an integer portion $N_0$ and a decimal portion $t_0$, which are separately output. The integer portion $N_0$ is input to the address generator 84 and the decimal portion $t_0$ is input to the first interpolator 72.

Similarly, the reciprocal number $1/\beta$ of a magnifying power $\beta$ in the second magnification processing is input to the multiplier 78. The reciprocal number $1/\beta$ represents a sampling interval of the second magnification processing.

The multiplier 78 integrates $1/\beta$ and adds 0.5 to it in the second magnification processing. Then, the multiplier 78 outputs an integer portion $N_1$ of the resulting value and a decimal portion $t_1$ thereof. The multiplier 78 adds 0.5 to displace the start position of the magnification processing by ½ of a pixel cycle so that the phase of the second magnification processing is reversed with respect to that of the first magnification processing. Since the second magnification processing uses data after the first magnification processing is performed, it must be designated to which ordinal number the data used in the second interpolator 74 corresponds as the data after the first magnification processing is performed. For this purpose, the integer portion $N_1$ is input to the multiplier 76, where it is multiplied by $1/\alpha$. The integer portion of the resulting value is input to the address generator 84. The decimal portion $t_1$ is input to the second interpolator 74.

The flip-flops 80 and 82 are used to permit the image data input to the interpolators 72 and 74 to be timed to the magnification data input from the multipliers 76 and 78 to the interpolators 72 and 74 for the magnification processing.

The address generator 84 is used to determine the address of a pixel to be subjected to the next magnification processing.

A specific example of the magnification processing of the embodiment under consideration will be described below in detail.

When a magnifying power s is input from the keyboard 18a or the like by an operator, the magnifying power $\alpha$ of the first magnification processing step ($\alpha=(s+1)/2$), the magnifying power $\beta$ of the second magnification processing step ($\beta=s/\alpha$), and the reciprocal numbers thereof $1/\alpha$ and $1/\beta$ are calculated in the key correcting subsection 60. Then, they are supplied to the image processing subsection 54 through the parameter coordinating subsection 62. The reciprocal number $1/\alpha$ of the first magnifying power $\alpha$ is input to the multiplier 76, and the reciprocal number $1/\beta$ of the second magnifying power $\beta$ is input to the multiplier 78.

Supposing here that the magnifying power is 110%, s=1.1, $\alpha=1.05$, $\beta=1.048$, $1/\alpha=0.95$, and $1/\beta=0.95$.

Figure 5:
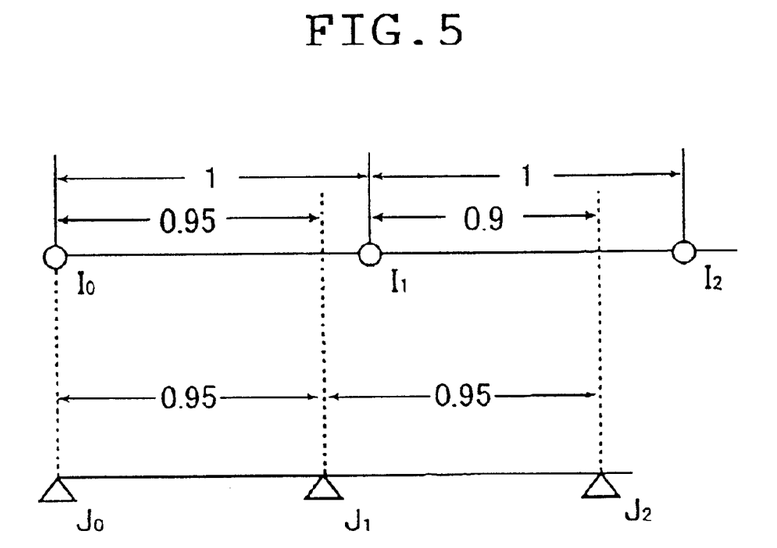
FIG. 5 is a schematic view showing the outline of an exemplary first magnification processing step in the image processing method according to the embodiment under consideration.

FIG. 5 schematically shows the first magnification processing step. In the first magnification processing step, original image data $I_i$ (i=0, 1, 2, . . . ) is enlarged at the magnifying power $\alpha$ of 1.05, thereby obtaining image data $J_1$ (i=0, 1, 2, . . . ).

Original image data $I_0$ is used as it is as first data $J_0$ after the first magnification processing is performed.

Supposing that the pixel interval of an original image is 1, the pixel interval after the magnification $1/\alpha$ is 0.95. When $1/\alpha$ of 0.95 is input to the multiplier 76, it outputs the integer portion $K_0$ of 0 and the decimal portion $t_0$ of 0.95. The address generator 84 receives the input of the integer portion $N_0$ and creates the address of data necessary to the interpolation of the next data $J_1$. Data $I_1$ whose address is designated is input to the first interpolator 72, which performs interpolation according to the following formula (1):

$$J_1 = \Sigma f_i(t_0) * I_i \qquad \ldots (1)$$

While various interpolation coefficients are contemplated as an interpolation coefficient $f_i(t_0)$ representing the interpolation kernel, the simplest interpolation coefficient is such that data on both the sides of a position to be interpolated is proportionally distributed and added.

When the interpolation is performed by the above method, since the integer portion $N_0$ is 0, the data $J_1$ to be interpolated is located between $I_0$ and $I_1$, and the address generator 84 generates 0 and 1 as addresses. Then, the two pieces of data $I_0$ and $I_1$ are input to the first interpolator 72 and interpolation is performed according to the following formula (2):

$$J_1 = (1-0.95)*I_0 + 0.95*I_1 \qquad \ldots (2)$$

To determine the next data $J_2$, $1/\alpha$ of 0.95 is integrated by the multiplier 76 as represented by $2*(1/\alpha) = 2*0.95 = 1.90$ and the integer portion $N_0$ of 1 and the decimal portion $t_0$ of 0.90 are output. The address generator 84 generates 1 and 2 as addresses based on the integer portion $N_0$ of 1. The first interpolator 72 performs interpolation of two pieces of data $I_1$ and $I_2$ according to the following formula (3):

$$J_2 = (1-0.90)*I_1 + 0.90*I_2 \qquad (3)$$

Thereafter, data $J_0$ after the first magnification processing is performed is determined in the same way.

Figure 6:
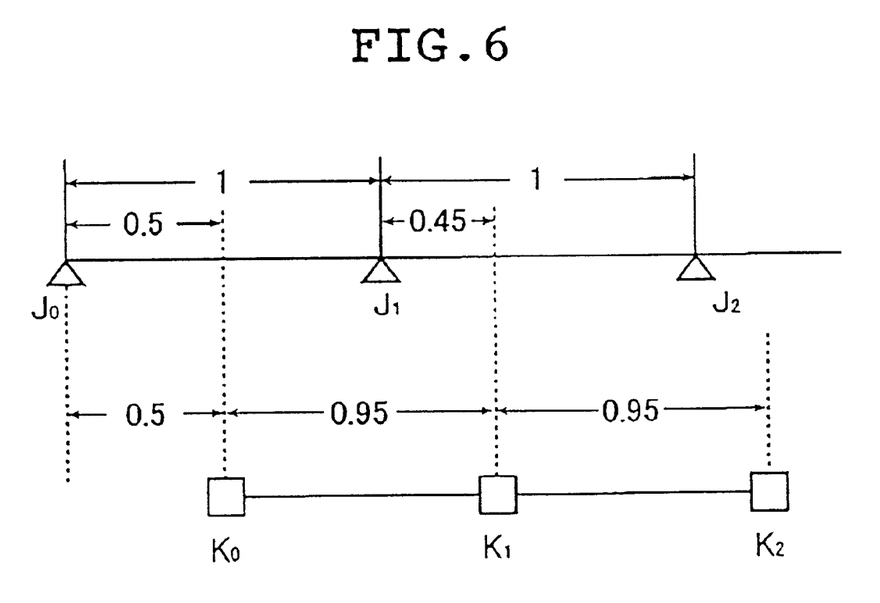
FIG. 6 is a schematic view showing the outline of an exemplary second magnification processing step in the image processing method according to the embodiment under consideration, similarly.

FIG. 6 schematically shows how the second magnification processing is performed. In the second magnification processing, the image data $I_i$ after the first magnification processing is performed is enlarged at the magnifying power $\beta$ of 1.048 and image data $K_k$ (k=0, 1, 2, . . . ) is obtained.

The second magnification processing is started from a position that is dislocated by ½ of a pixel cycle. For this purpose, 0.5 is initially added in the multiplier 78. Therefore, operation in the multiplier 78 is performed according to an operation formula represented by the following formula (4):

$$n*(1/\beta) + 0.5 = n*0.95 + 0.5 \qquad (4)$$

where n is 0 or a natural number.

Supposing n=0, the initial data $K_0$ of 0.5 is obtained as the result of operation performed by the multiplier 78, and the integer portion $N_1$ of 0 and the decimal portion $t_1$ of 0.5 are output.

The second magnification processing is performed to the image data after the first magnification processing is performed. The integer portion $N_1$ output from the multiplier 78 is input to the multiplier 76 and multiplied by the pixel interval $1/\alpha$ after the first magnification processing is performed. The resulting integer portion $N_0$ is input to the address generator 84, whereby the address of original image data necessary to calculate the image data after the first magnification processing that is necessary for the second magnification processing in the second interpolator 74 is created.

The second interpolator 74 performs interpolation using the designated data $J_j$ in general according to the following formula (5) and obtains the image data $K_k$ after the second magnification processing is performed.

$$K_k = \Sigma f_j(t_1) * J_j \qquad (5)$$

When an interpolation method of performing interpolation by proportionally distributing data on both the sides of a position to be interpolated is used as the simplest interpolation method as in the first magnification processing, the initial data $K_0$ is determined according to the following formula (6), as shown in FIG. 6, as the average of the initial two pieces of data $J_0$ and $J_1$ after the first magnification processing is performed:

$$K_0 = 0.5*J_0 + C.5\&J_1 \qquad (6)$$

When an interpolation method of performing interpolation by proportionally distributing data on both the sides of a position to be interpolated is used as the simplest interpolation method as in the first magnification processing, the initial data $K_0$ is determined according to the following formula (6), as shown in FIG. 6, as the average of the initial two pieces of data $J_0$ and $J_1$ after the first magnification processing is performed:

$$K_0 = 0.5*J_0 + C.5*J_1 \qquad (6)$$

To determine the next data $K_1$, $1*0.95+0.5=1.45$ is obtained from n=1 by the multiplier 78, and the integer portion $N_1$ of 1 and the decimal portion $t_1$ of 0.45 are output therefrom. Then, $K_1$ is determined according to the following formula (7):

$$K_1 = (1-0.45)*J_1 + 0.45*J_2 \qquad (7)$$

Thereafter, the image data $K_k$ after the second magnification processing is performed is determined in the same way, and magnified image data at the magnifying power $s = \alpha*\beta = 1.1$ can be obtained by successively performing the first magnification processing at the magnifying power $\alpha$ of 1.05 and the second magnification processing at the magnifying power of 1.048.

Further, since the original image data is used as it is as the initial data of the first magnification processing at the time, the initial data is perfectly in agreement with the original data, whereas the second magnification processing is started by dislocating the start position thereof by ½ of a pixel cycle.

Next, subsequently to the magnification processing that was performed in the horizontal direction at the magnifying power s, the electrical magnification unit 68 can perform in quite the same manner the magnification processing in the vertical direction at the magnifying power s.

Thus, electronic magnification unit 68 can obtain image data magnified at the magnifying power s, in which generation of artifacts such as moiré and beats was suppressed or prevented.

As described above, the artifacts can be easily suppressed with the simple arrangement of the apparatus in the embodiment under consideration. However, the electronic magnification unit 68 for performing the magnification processing according to the present invention, which is shown in FIG. 4, is only an example, and various types of electronic magnification units can be contemplated without being limited to the electronic magnification unit 68.

Further, when the second magnification processing is performed whether the magnification processing performed is in the horizontal direction or the vertical direction, interpolation processing may be performed left and right from a pixel position where n×sampling interval +0.5 (n: natural number) becomes a natural number. With this manner, it is not necessary to dislocate the start position of the second magnification processing by ½ of a pixel cycle.

The embodiment mentioned above performs the magnification processing in the vertical direction after the magnification processing is performed in the horizontal direction. However, this is not the sole case of the invention, and the magnification processing in the vertical direction may precede the magnification processing in the horizontal direction to the contrary. Alternatively, the former and the latter may be performed simultaneously.

Further, the embodiment mentioned above uses the same magnifying power s to perform the magnification process steps in the horizontal and vertical directions. However, this is not the sole case of the invention, and the magnifying power of the magnification processing in the horizontal direction may be different from that of the magnification processing in the vertical direction. Thus, when the former and the latter are represented by $s_1$ and $s_2$, respectively, the magnifying powers α of the first magnification processing steps that are performed in the horizontal and vertical directions may be represented by $\alpha=(s_1 \div 1)/2$ and $\alpha=(s_2+1)/2$, respectively, and the magnifying powers β of the second magnification processing steps that are performed in the horizontal and vertical directions by $\beta=s_1/\alpha=2\,s_1/(s_1 \div 1)$ and $\beta=s_2/\alpha=2\,s_2/(s_2 \div 1)$, respectively.

In the embodiment mentioned above, when the magnifying power of the magnification processing is represented by s, the magnifying power of the first magnification processing and that of the second magnification processing are represented by $\alpha=(s+1)/2$ and $\beta=s/\alpha=2\,s/(s-1)$, respectively. However, this is not the sole case of the invention, and the former may be represented by $\beta=s/\alpha=2\,s/(s+1)$ and the latter by $\alpha=(s \div 1)/2$.

Further, in the embodiment mentioned above, the start position of the second magnification processing is dislocated by ½ of a pixel cycle with respect to the start position of the first magnification processing. However, the invention is not limited to this, and the start position of the first magnification processing may be dislocated by ½ of the pixel cycle with respect to that of the second magnification processing. That is, in the first and second magnification processing steps, the start position of the first magnification processing and that of the second magnification processing may be dislocated relatively to each other in the horizontal and vertical directions by ½ of the pixel cycle.

Furthermore, in the first and second magnification processing steps, the start position of the first magnification processing and that of the second magnification processing are dislocated relatively to each other on the pixel cycle, and if the start positions of the two magnification processing steps can be dislocated relatively to each other so that the phases of the pixel positions in the first and second magnification processing steps are reversed to each other, the dislocation to be made is not limited to by ½ pixel, but the start positions may be dislocated by any degree of the pixel cycle.

As compared with the suppression of the artifacts such as moiré and beats due to the random noise as disclosed in Japanese Unexamined Patent Publication No. 10-98612, supra, the magnification processing performed in the image processing method and apparatus of the present invention enables processing in accordance with the frequency that an image has, ensures favorable frequency characteristics, and can prevent or completely eliminate the generation of the artifacts such as moiré and beats in accordance with the frequency that the image has. The reducing effects are significantly large, and appropriate reducing effects of the artifacts can be obtained in accordance with the image, no matter how the image is. Thus, the magnification processing provides significantly high effects.

While the image processing method and the image processing apparatus of the present invention have been described above in detail with reference to various embodiments, the present invention is by no means limited to the above embodiments and it goes without saying that various improvements and modifications can be made within the range which does not depart from the gist of the invention.

As described above in detail, according to the present invention, the artifacts generated in the image magnification (enlargement and reduction) processing can be suppressed.

Namely, the present invention enables processing in accordance with the frequency that an image has, ensures favorable frequency characteristics, and can prevent or completely eliminate the generation of the artifacts such as moiré and beats in accordance with the frequency that the image has. The reducing effects are significantly large, and appropriate reducing effects of the artifacts can be obtained in accordance with the image, no matter how the image is. The magnification processing can provide the image processing method and apparatus in which the reducing effects are significantly high.

What is claimed is:

1. An image processing method for performing magnification processing at a specified magnifying power, comprising the steps of:

dividing said magnification processing at the specified magnifying power into a first magnification processing step and a second magnification processing step; and performing said first magnification processing step and said second magnification processing step, wherein a start position of said first magnification processing step and a start position of said second magnification processing step are dislocated relatively to each other so that phases of pixel positions in said first and second magnification processing steps are reversed to each other.

2. The image processing method according to claim 1, wherein, when said specified magnifying power is represented by s, said first and second magnification processing steps have magnifying powers represented by $(s+1)/2$ and $2s/(s+1)$, respectively.

3. The image processing method according to claim 2, wherein the magnifying power of said first magnification processing step is represented by $(s \div 1)/2$ and the magnifying power of said second magnification processing step is represented by $2s/(s+1)$.

4. The image processing method according to claim 1, wherein, when said specified magnifying power is represented by $s_1$ in a first direction and by $s_2$ in a second direction perpendicular to said first direction, respectively, said first magnification processing step has a magnifying power in the first direction represented by $(s_1 \div 1)/2$ and a magnifying power in the second direction represented by $(s_2 \div 1)/2$, respectively, and said second magnification processing step has a magnifying power in the first direction represented by $2s_1/(s_1+1)$ and a magnifying power in the second direction represented by $2s_2/(s_2 \div 1)$, respectively.

5. The image processing method according to claim 4, wherein said magnifying power $s_1$ in the first direction is is equal to said magnifying power $s_2$ in the second direction.

6. The image processing method according to claim 1, wherein, in said first and second magnification processing steps, the start position of said first magnification processing step and the start position of said second magnification processing step are dislocated relatively to each other in the first direction and the second direction perpendicular to the first direction.

7. The image processing method according to claim 1, wherein, in said first and second magnification processing steps, the start position of said first magnification processing step and the start position of said second magnification processing step are dislocated relatively to each other by ½ of a pixel cycle in the first direction and the second direction perpendicular to the first direction.

8. The image processing method according to claim 7, wherein the start position of said second magnification processing step is dislocated by ½ of said pixel cycle with respect to the start position of said first magnification processing step in said first direction and said second direction perpendicular to said first direction.

9. The image processing method according to claim 1, wherein said magnification processing at the specified magnifying power is performed on a multi-level image.

10. An image processing apparatus for performing magnification processing at a specified magnifying power, comprising:
- a device for performing a first magnification processing step;
- a device for performing a second magnification processing step; and
- a device for dislocating a start position of said first magnification processing step and a start position of said second magnification processing step relatively to each other so that phases of pixel positions in said first and second magnification processing steps are reversed to each other.

11. The image processing apparatus according to claim 10, wherein, when said specified magnifying power is represented by s, said first and second magnification processing steps have magnifying powers represented by $(s+1)/2$ and $2s/(s+1)$, respectively.

12. The image processing apparatus according to claim 11, wherein the magnifying power of said first magnification processing step is represented by $(s+1)/2$ and the magnifying power of said second magnification processing step is represented by $2s/(s+1)$.

13. The image processing apparatus according to claim 10, wherein, when said specified magnifying power is represented by $s_1$ in a first direction and by $s_2$ in a second direction perpendicular to said first direction, respectively, said device for performing the first magnification processing step performs the magnification processing in which magnifying powers in the first and second directions are represented by $(s_1+1)/2$ and $(s_2+1)/2$, respectively, and said device for performing the second magnification processing step performs the magnification processing in which magnifying powers in the first and second directions are represented by $2s_1/(s_1+1)$ and $2s_2/(s_2+1)$, respectively.

14. The image processing apparatus according to claim 13, wherein said magnifying power $s_1$ in the first direction is equal to said magnifying power $s_2$ in the second direction.

15. The image processing apparatus according to claim 10, wherein said device for dislocating the start position of said first magnification processing step and the start position of said second magnification processing step is a device by which the start position of said first magnification processing step and the start position of said second magnification processing step are dislocated relatively to each other in the first direction and the second direction perpendicular to the first direction in said first and second magnification processing steps.

16. The image processing apparatus according to claim 10, wherein said device for dislocating the start position of said first magnification processing step and the start position of said second magnification processing step is a device by which the start position of said first magnification processing step and the start position of said second magnification processing step are disclosed relatively to each other by ½ of a pixel cycle in the first direction and the second direction perpendicular to the first direction.

17. The image processing apparatus according to claim 16, wherein said device for dislocating the start position of said first magnification processing step and the start position of said second magnification processing step dislocates the start position of said second magnification processing step by ½ of said pixel cycle with respect to the start position of said first magnification processing step in said first direction and said second direction.

18. The image processing apparatus according to claim 10, wherein said magnification processing at the specified magnifying power is performed on a multi-level image.

* * * * *

UNITED STATES PATENT AND TRADEMARK OFFICE
CERTIFICATE OF CORRECTION

PATENT NO. : 6,608,943 B1
DATED : August 19, 2003
INVENTOR(S) : Takuya Hirashima It is certified that error appears in the above-identified patent and that said Letters Patent is hereby corrected as shown below:

<u>Column 14,</u>
Line 29, change "$(s \div 1)/2$" to -- $(s+1)/2$ --;
Line 37, change "$(s_1 \div 1)/2$" to -- $(s_1+1)/2$ --;
Line 39, change "$(s_2 \div 1)/2$" to -- $(s_2+1)/2$ --;
Line 43, change "is is equal" to -- is equal --;

<u>Column 15,</u>
Line 21, change "$(s \div 1)/2$" to -- $(s+1)/2$ --;
Line 31, change "$(s_1 \div 1)/2$ and $(s_2 \div 1)/2$" to -- $(s_1+1)/2$ and $(s_2+1)/2$ --; and <u>Column 16,</u>
Line 20, change "are disclosed" to -- are dislocated --.

Signed and Sealed this

Twenty-seventh Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,608,943 B1　　　　　　　　　　　　　　　　　　　　　　　Page 1 of 1
DATED         : August 19, 2003
INVENTOR(S)   : Takuya Hirashima It is certified that error appears in the above-identified patent and that said Letters Patent is hereby corrected as shown below:

<u>Column 14,</u>
Line 11, change "$2s_2/(s_2 \div 1)$ to -- $2s_2/(s_2/(s_2+1)$ --.

Signed and Sealed this

Third Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,608,943 B1  Page 1 of 1
DATED : August 19, 2003
INVENTOR(S) : Takuya Hirashima

It is certified that error appears in the above-identified patent and that said Letters Patent is hereby corrected as shown below:

<u>Column 14,</u>
Line 43, change "$2s_2/(s_2 \div 1)$ to -- $2s_2/(s_2+1)$ --.

This certificate supersedes Certificate of Correction issued August 3, 2004.

Signed and Sealed this

Twenty-eighth Day of September, 2004

JON W. DUDAS
*Director of the United States Patent and Trademark Office*